United States Patent Office

WILLIAM F. PATTERSON, OF VANCEBURG, KENTUCKY.

Letters Patent No. 62,679, dated March 5, 1867.

IMPROVEMENT IN THE MANUFACTURE OF PAINTS AND OTHER COMPOUNDS FROM BITUMINOUS SLATES, &c.

*The Schedule referred to in these Letters Patent and making part of the same.*

TO WHOM IT MAY CONCERN:

Be it known that I, WILLIAM F. PATTERSON, of Vanceburg, in the county of Lewis, and State of Kentucky, have invented or discovered a new and useful Improvement in the Manner of Treating Slate that is afterwards to be ground and used for Paint or other Plastic Material, and do hereby declare the following to be a full, clear, and exact description of the same.

Slate, as well as many other mineral substances and earths, has been used in its natural condition for making paint. I lay no claim to any such production.

My invention consists in using, as below mentioned, slate which has been subjected to distillation in closed vessels, or that which is commonly known as retorted slate, by which process it has been divested of many of its constituents, such as sulphurets of iron and the lighter hydrocarbons, while those matters which do remain give to the material great permanence under atmospheric agencies, a permanence which does not belong to the original material, nor even to that which has been burned, without this previous treatment, in retorts or closed vessels. This retorted slate may be reduced to an impalpable powder and used with any of the oils, as a paint, or it may be mixed with other ingredients, and with oils, gums, or other cementative substances, and made into a paste or plastic substance, and thus used. In its retorted condition the slate maintains its original color, or, if changed, is darker than in its natural state, and by calcining it after it is retorted it assumes a reddish or brown color. The color of the retorted slate, after it is reduced to a powder or to paint, may be changed by the admixture of other colors with it. Where bituminous shale or slate is subjected to destructive distillation in a retort for divesting it of its oil, I find the retorted shale at hand without the expense of specially producing it; as the oil distilled from it will pay or partially pay for the expense of the retorting. And when calcined it may be done in a furnace or by exposing it in its heated condition to the air in a pile. The powdered retorted or retorted and calcined slate, may, when made into a plastic substance by the admixture of oils, hydrocarbon, natural or distilled, or gums, or any other substances of a cementative nature, be moulded into ornaments and useful articles.

Having thus described my invention, what I claim, is—

The use of powdered or ground retorted slate with any of the oils, hydrocarbons, or gums, for the purpose of forming a paint, paste, or plastic compound; and this I claim whether other material or colors be mixed with the retorted slate, powder, or paint, or whether calcined after it is retorted or not, substantially as described.

WILLIAM F. PATTERSON.

Witnesses:
JOHN S. HOLLINGSHEAD,
WM. J. FAHERTY.